US005157967A

United States Patent [19]
Wieczorek

[11] Patent Number: 5,157,967
[45] Date of Patent: Oct. 27, 1992

[54] DYNAMIC FLOW CALIBRATION OF A FUEL INJECTOR BY SELECTIVE POSITIONING OF ITS SOLENOID COIL

[75] Inventor: David P. Wieczorek, Newport News, Va.

[73] Assignee: Siemens Automotive L.P., Auburn Hills, Mich.

[21] Appl. No.: 738,653

[22] Filed: Jul. 31, 1991

[51] Int. Cl.[5] ............ G01M 19/00
[52] U.S. Cl. ............ 73/119 A
[58] Field of Search ............ 73/119 A, 3; 239/533.6, 239/533.12, 585; 335/299

[56] References Cited

U.S. PATENT DOCUMENTS 4,437,488 3/1984 Taggart et al. ............ 239/585 X
4,515,129 5/1985 Stettner ............ 239/585

*Primary Examiner*—Jerry W. Myracle
*Attorney, Agent, or Firm*—George L. Boller; Russel C. Wells

[57] ABSTRACT

An electromagnetically operated fuel injector (10, 10′) has an adjustment mechanism (84) that is effective to selectively position the solenoid coil assembly (26) in relation to the working gap (51) between the stator (28) and the armature (30) for the purpose of performing dynamic flow calibration.

18 Claims, 4 Drawing Sheets

DYNAMIC FLOW CALIBRATION OF A FUEL INJECTOR BY SELECTIVE POSITIONING OF ITS SOLENOID COIL

FIELD OF THE INVENTION

This invention relates to electromagnetic operated fuel injectors of the type used in the fuel systems of internal combustion engines that power automotive vehicles, especially to the dynamic flow calibration of such fuel injectors.

BACKGROUND AND SUMMARY OF THE INVENTION

It is known to calibrate a fuel injector's dynamic flow by selectively setting the degree of compression of a spring that acts on the armature. This is because the dynamic flow is a function of the response time of the fuel injector, and the response time of the fuel injector is in turn a function of the degree of spring compression. In a top-feed type fuel injector, such calibration is accomplished by using a hollow tube to compress the spring while the flow is being measured, and then staking the tube in place after the desired flow has been attained. The use of a hollow tube allows the liquid fuel to be fed through the means of adjustment and does not require any sort of fluidic seal. A bottom-feed type fuel injector is dynamically calibrated by using a solid adjusting pin to compress the spring, but a fluid seal is required to contain the fuel since the fuel inlet to the fuel injector is located closely adjacent the fuel outlet from the fuel injector.

In many automotive vehicles, the increasing scarcity of available space within the engine compartment has created a demand for miniaturized fuel injectors. The ability to decrease the size of a top-feed fuel injector is limited by the requirement that the size of the fuel hole through the adjusting tube be large enough to accommodate the maximum fuel flow without imposing an unacceptable restriction to that flow. While a bottom-feed fuel injector that is dynamically calibrated in the manner described above requires no fuel hole through the adjusting pin, it is necessary that a sealing means be provided around the calibration means. Such a sealing means occupies space and therefore inhibits the ability to miniaturize that type of fuel injector.

The present invention relates to a new and improved method for dynamic flow calibration of an electromagnetically operated fuel injector which renders the fuel injector more conducive to miniaturization. The invention also relates to a novel construction for an electromagnetically operated fuel injector that promotes the efficient practice of the method, particularly in the automated mass-production fabrication of such fuel injectors.

Briefly, the invention involves the attainment of a desired dynamic flow calibration by the creation of a desired condition for the forces acting on the fuel injector's armature. This is accomplished by the selective relative positioning of the injector's stator/armature interface to the injector's solenoid coil. Two specific advantages of the invention that allow for fuel injector miniaturization include the elimination of the need for a fluid sealing means around the means which selectively sets the dynamic calibration, and the ability to perform the dynamic calibration in a very small amount of space. Increased resolution within the calibration range is yet another advantage.

The foregoing, along with additional features, advantages, and benefits of the invention will be seen in the ensuing description and claims which should be considered in conjunction with the accompanying drawings. The drawings disclose a presently preferred embodiment of the invention in accordance with the best mode contemplated at the present time in carrying out the invention.

DESCRIPTION OF THE PREFERRED EMBODIMENT

Figure 1:
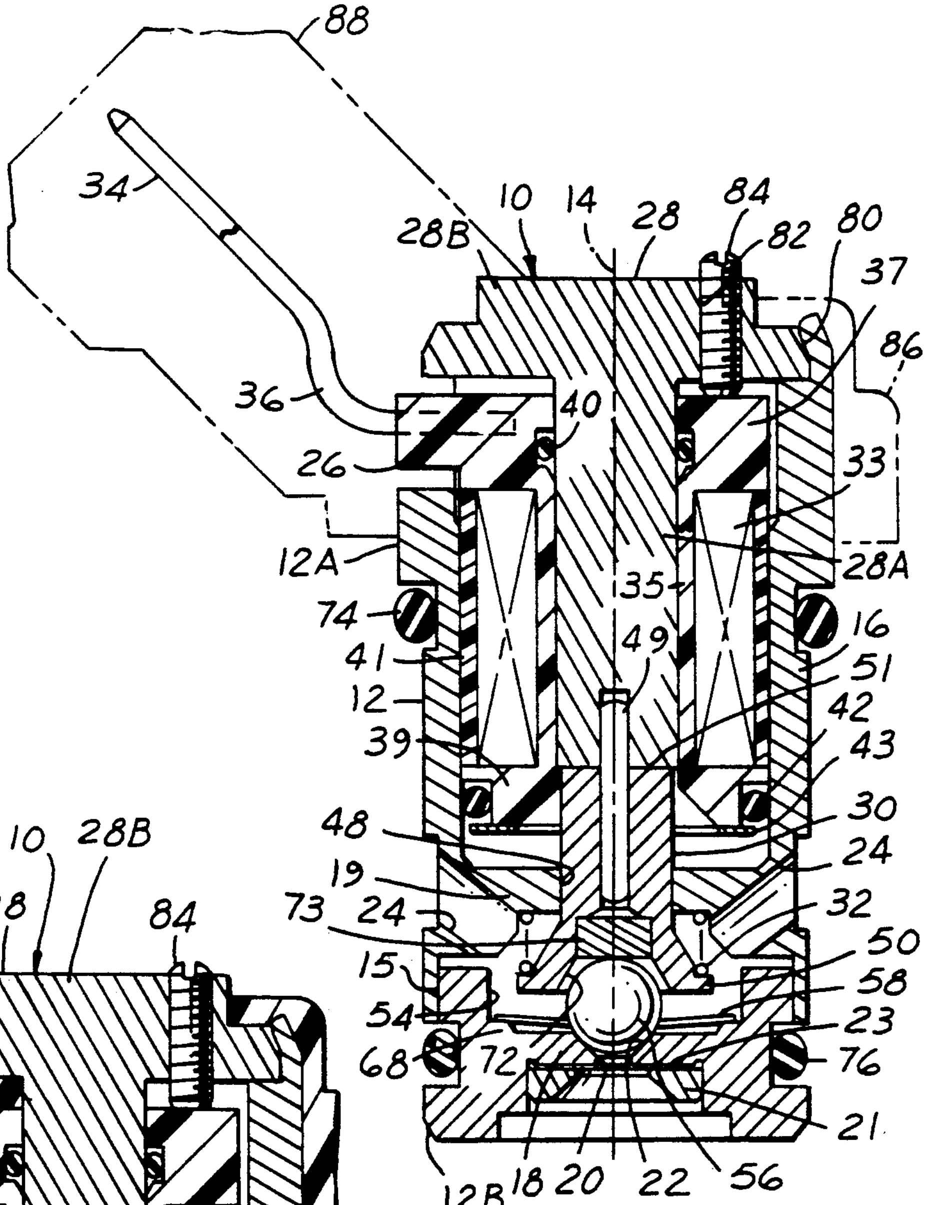
FIG. 1 is a longitudinal cross sectional view through a fuel injector embodying principles of the present invention at a particular stage of the injector fabrication process before dynamic flow calibration.

FIG. 1 shows an embodiment of electrically operated fuel injector 10 which comprises a body 12 having a main longitudinal axis 14. Body 12 is composed of two separate parts 12A, 12B which are joined together at a joint 15. Body 12 comprises a cylindrical side wall 16 which is generally coaxial with axis 14 and an end wall 18 that is disposed at one longitudinal end of side wall 16 generally transverse to axis 14. Part 12B contains end wall 18 and a portion of side wall 16. Part 12A contains the remainder of side wall 16, and it also comprises a transverse wall 19 which is spaced interiorly of end wall 18.

The nozzle, or tip, end of the fuel injector has a circular through-hole 20 that is provided in end wall 18 substantially coaxial with axis 14 to provide a fuel outlet from the interior of body 12. Through-hole 20 has a frusto-conical valve seat 22 at the axial end thereof which is at the interior of body 12. A thin disc orifice member 23 containing one or more orifices is disposed over the open exterior end of through-hole 20 so that the fuel that passes through through-hole 20 is emitted from the injector valve via such orifices. Member 23 is held in place on body 12 by means of an annular retainer 21 that is secured to part 12B.

Fuel injector 10 has a fuel inlet in the form of plural inclined radial holes 24 that are circumferentially spaced apart around body 12 and extend through side wall 16. It also contains an internal fuel passage, to be hereinafter described in more detail, from the fuel inlet to the fuel outlet. Holes 24 are located immediately adjacent transverse interior wall 19, adjacent to the face thereof that is toward part 12B. The placement of the fuel inlet in the injector's side wall closely adjacent the outlet is representative of a configuration that is commonly called a bottom-feed type fuel injector.

Fuel injector 10 further comprises an electrical actuator mechanism which includes a solenoid coil assembly 26, a stator 28, an armature 30, and a bias spring 32.

Solenoid coil assembly 26 has a generally tubular shape and comprises a length of magnet wire that has been wound onto a plastic bobbin 35 to form an electromagnetic coil 33 whose terminations are joined to respective electrical terminals 34, 36 which project away from the body at an inclined angle. The terminals 34, 36 are configured for mating connection with respective terminals of an electrical connector plug (not shown) which is connected to the fuel injector when the fuel injector is in use. Between the bobbin flanges 37, 39, the radially outer face of coil 33 is covered by a plastic overmold layer 41.

Stator 28 has a shape which provides for it to be cooperatively associated with solenoid coil assembly 26 in the manner shown in FIG. 1. The stator cooperates with body 12 in forming the magnetic circuit in which the magnetic flux that is generated by coil 33 when the coil is electrically energized is concentrated. Stator comprises a circular cylindrical shank 28A that fits closely within solenoid coil assembly 26 and a head 28B forming a generally circular flange that radially overlaps the upper end of solenoid coil assembly 26 as viewed in the drawing FIG. and abuts body 12.

Shank 28A is hydraulically sealed with respect to the inner side wall of bobbin 35 by means of an elastomeric O-ring seal 40. Seal 40 prevents fuel that has been introduced into the interior of the fuel injector via holes 24 from leaking out of the fuel injector via any potential leak paths that may exist between the external cylindrical surface of the stator shank and the internal cylindrical surface of the bobbin. The outside diameter of solenoid coil assembly 26 is sealed with respect to the inside diameter of side wall 16 by means of another O-ring seal 42 which is disposed in a groove in the edge of the lower bobbin flange 39 and captured by a retaining ring 43.

Transverse interior wall 19 comprises a circular through-hole 48 that is coaxial with axis 14. Armature 30 has a generally circular cylindrical body that passes axially through through-hole 48. Axial guidance of the armature is provided by a cylindrical pin 49 that is disposed between stator 28 and armature 30 in the manner shown. The portion of the armature that is disposed between walls 18 and 19 is enlarged to provide a circular flange 50 as a seat for one end of spring 32. The opposite end of the spring bears against wall 19 so that the spring serves to resiliently bias the armature downwardly, toward valve seat 22.

FIG. 1 illustrates the condition of the fuel injector when the solenoid coil assembly is not being energized. The resilient bias of spring 32 on armature 30 positions the armature so that a small working gap 51 exists at the stator/armature interface between the juxtaposed axial end faces of the stator shank and the armature body. When the solenoid coil is energized, the magnetic force exerted on the armature will move the armature toward the stator to reduce the working gap.

The valve element is a sphere 56 that in FIG. 1 is shown coaxial with axis 14 and forced by armature 30 to be seated on valve seat 22 so as to close through-hole 20. This represents the closed condition which the fuel injector assumes when solenoid coil assembly 26 is not electrically energized. The resilient bias of spring 32 acting through armature 30 causes sphere 56 to be forcefully held on seat 22.

Sphere 56 is a separate part that is constrained in a particular way so that it will follow the longitudinal motion of armature 30 when the latter is operated by the solenoid assembly, but in such a way that the sphere will always be self-centering on seat 22 when the fuel injector is operated closed.

Additional mechanism which cooperates with armature 30 in controlling sphere 56 is a resilient spring disc 58 which is disposed for coaction with sphere 56. The shape of disc 58, which is representative of one of a number of possible designs, is circular and has a circumferentially uninterrupted radially outer margin, but contains a central through-aperture which defines a circular void of a diameter less than the diameter of sphere 56. It also defines one or more additional voids for the internal fuel passage through which fuel flows from inlet holes 24 to valve seat 22.

Disc 58 and sphere 56 are disposed in fuel injector 10 such that sphere 56 fills the entirety of the central circular void in the disc. End wall 18 contains a raised annular ledge 68 surrounding seat 22 coaxial with axis 14. The circumferentially continuous outer peripheral margin of disc 58 rests on ledge 68. The diameter of the disc is less than the diameter of the surrounding wall surface 54 so that the disc is capable of a certain limited amount of radial displacement within the interior of body 12.

In the closed condition shown in FIG. 1, the resilient bias force exerted by spring 32 acting through armature 30 on sphere 56, in addition to forcing the sphere to close through-hole 20, has also flexed spring disc 58 so that the spring disc is exerting a certain force on the sphere in the opposite direction from the force exerted by spring 32.

The energization of solenoid coil assembly 26 will exert an overpowering force on armature 30 to reduce gap 51 thereby further compressing spring 32 in the process. The resulting motion of the armature away from sphere 56 means that the dominant force applied to the sphere during this time is that which is exerted by disc 58 in the direction urging the sphere toward the armature. Disc 58 is designed through use of conventional engineering design calculations to cause the sphere to essentially follow the motion of the armature toward stator 28. The result is that the sphere unseats from seat 22 to allow the pressurized liquid fuel that is present within the interior of the fuel injector to pass through through-hole 20. So long as sphere 56 remains unseated from seat 22, fuel can flow from holes 24 to the fuel outlet at through-hole 20.

When solenoid assembly 26 is de-energized, the magnetic attraction force on armature 30 dissipates to allow spring 32, acting through the armature, to cause the sphere to re-seat on seat 22 and close through-hole 20. It is to be observed that the amount of longitudinal travel of the armature is quite small so that a portion of the sphere will always be disposed in seat 22 even though the sphere itself may not be closing through-hole 20 to fuel flow. If for any reason sphere 56 were to become eccentric with respect to seat 22, the reaction of the sphere with the valve seat in response to armature motion tending to close the valve will create a self-centering tendency toward correcting the eccentricity. This self-centering tendency is allowed to occur because disc 58 is unattached to the valve body, i.e. the disc is prevented from itself preventing the sphere from ultimately centering itself on the seat to close the through-hole. Stated another way, the sphere can "float" radially so that any eccentricity which may exist between the sphere and the seat is eliminated as the armature operates to force the sphere against the seat toward the final objective of closing the fuel outlet.

While the sphere has thus been shown to be axially captured between armature 30 and disc 58, there is also a certain radial confinement that is provided by the particular shape of the armature tip end. The tip end of the armature is shaped to have a frusto-conical surface 72 that is essentially coaxial with axis 14. When sphere 56 is seated on seat 22, surface 72 is spaced from the sphere. There is thus a limited range of radial displacement (eccentricity relative to axis 14) for the sphere which will be tolerated before surface 72 will actively prevent any further radial displacement of the sphere, provided that the sphere is otherwise allowed to be displaced radially sufficiently to abut surface 72. It is also to be observed that the armature is shown as a two-part construction comprising a main armature body and a hardened insert 73 which provides the contact surface with sphere 56 to axially capture the sphere.

Although not specifically shown in the drawings, the sphere may be replaced by a sphere/ring unit like that shown in the inventor's commonly assigned co-pending patent application Ser. No. 07/684,619, filed Apr. 12, 1991.

In use, the injector is typically operated in a pulse width modulated fashion. The pulse width modulation creates axial reciprocation of the sphere so that fuel is injected as separate discrete injections. The exterior of side wall 16 contains axially spaced apart circular grooves which receive O-ring seals 74, 76 for sealing of body 12 to an injector-receiving socket into which a bottom-feed type injector is typically disposed when the injector is used on an automotive vehicle internal combustion engine.

If a constant pressure differential exists between the fuel inlet and the fuel outlet of the fuel injector, fuel injected per injection will be a function of the pulse width energization. The actual response of the fuel injector is a function of the set of forces acting on the actuating mechanism, and so to assure that a mass-produced fuel injector will comply with a dynamic flow specification, dynamic flow calibration may be performed. The present invention performs dynamic flow calibration by selectively relatively positioning solenoid coil assembly 26 and stator 28. Such positioning establishes the extent to which the stator/armature interface, i.e. working gap 51, is disposed within bobbin 35.

It is known that the magnetic attraction force exerted by a generally uniformly wound solenoid coil which is energized with a given electric current has a gradient along the coil's axis. Measurements taken along the coil's axis through the coil will show that the magnetic force progressively increases from one end to the half-way point and then progressively decreases from the half-way point to the opposite end. When a stator is present within the coil, as in fuel injector 10, the same effect ensues. The present invention makes use of this effect for the purpose of dynamic flow calibration, and does so by allowing solenoid coil assembly 26 to be selectively axially positioned within body 12 relative to stator 28.

Stator head 28B closes the top of body 12, and the two parts are secured together at a joint 80. A threaded hole 82 extends through head 28B in eccentric, but nevertheless parallel, relation to axis 14. A set screw 84 is threaded into hole 82. The tip end of set screw 84 bears against bobbin flange 37. Its opposite end contains a tool-receiving slot to which the tip end of an adjusting tool, such as a screwdriver, can be fitted for rotating the set screw. Rotation that advances set screw 84 more fully into hole 82 will be effective to bodily move the entire solenoid coil assembly 26 within the interior of the fuel injector toward the nozzle end. Sufficient space is provided between ring 43 and wall 19 to allow such movement. As the solenoid coil assembly is being so moved, the working gap 51 is being disposed increasingly within the bobbin 35 along that portion thereof which is within the lower half of coil 33, while the size of the working gap remains unchanged. In other words, the solenoid coil assembly is moved relative to both the armature and the stator, while both the armature and the stator remain stationary on body 12. As a result, the magnetic force that is effective on the armature is correspondingly increased because of the magnetic force gradient effect described above. Dynamic flow calibration is performed by operating the fuel injector under a given set of operating conditions, and concurrently measuring the dynamic flow. The measured flow is compared with a desired flow. If the comparison is satisfactory, no adjustment is needed. If it is not, then set screw 84 is adjusted until compliance is attained. Advancement of the set screw will move the solenoid coil assembly against the force exerted by fuel pressure acting against the opposite end of the solenoid coil assembly. If the set screw is retracted, the fuel pressure will move the solenoid coil assembly away from wall 19 so as to keep the opposite end of the solenoid coil assembly against the tip of the set screw. When the set screw has been adjusted to produce the desired dynamic flow, the fuel injector is deemed to have proper dynamic flow calibration.

Once the dynamic flow calibration has been attained, the fabrication of the fuel injector can be completed. The completion involves injection molding a composite material onto and around the top of the fuel injector to create a surround 86 of dielectric material including a shell 88 disposed in laterally bounding relation to electrical terminals 34, 36. The several parts may be so shaped, and the injection molding so conducted, that the composite material will, upon curing, prevent the solenoid coil assembly from being moved from the position to which it has been set by screw 84.

Figure 2:
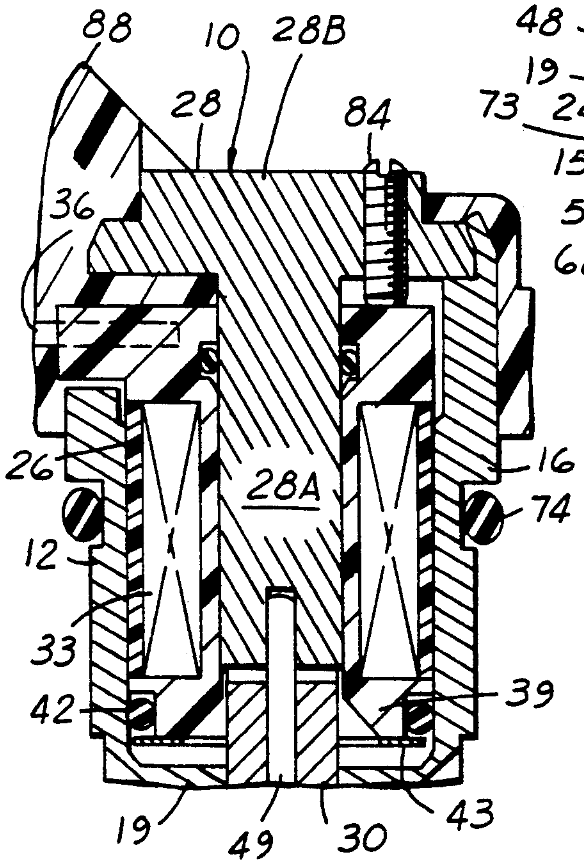
FIG. 2 is a view like that of FIG. 1, but with a portion broken away, and after completion of both the fabrication process and dynamic flow calibration.
Figure 3:
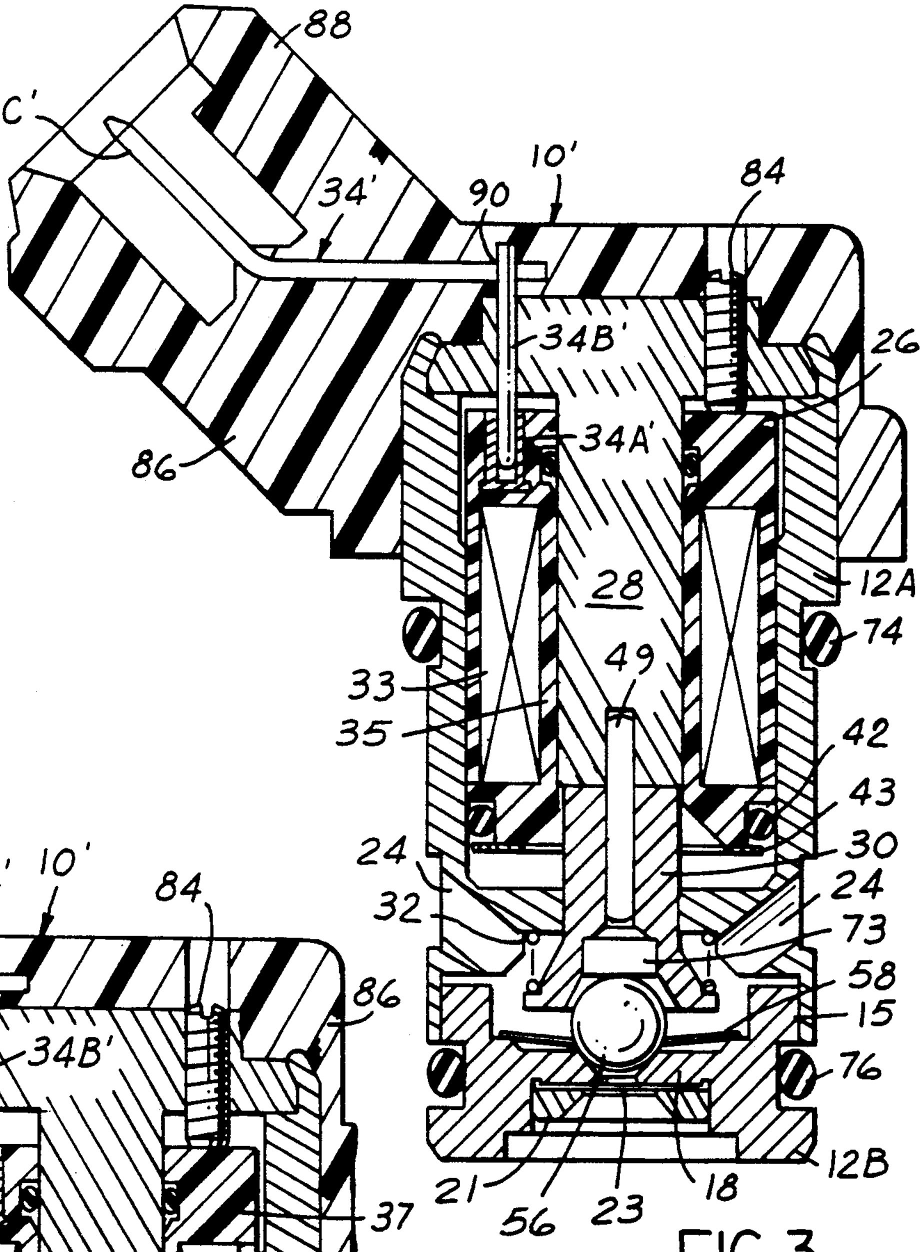
FIG. 3 is a view like that of FIG. 1, but of another embodiment, after completion of the fabrication process, but before dynamic flow calibration.
Figure 4:
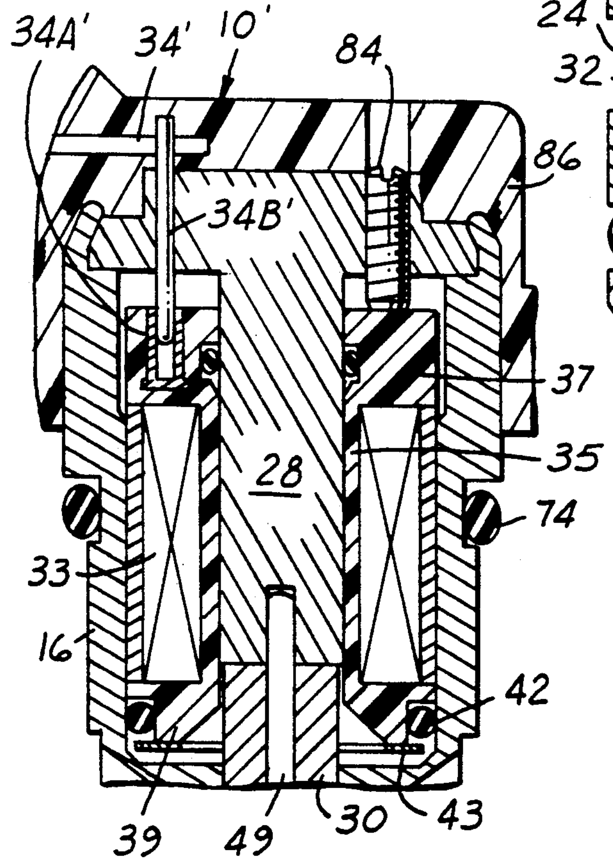
FIG. 4 is a view like that of FIG. 3, but with a portion broken away, and after performance of dynamic flow calibration.
Figure 5:
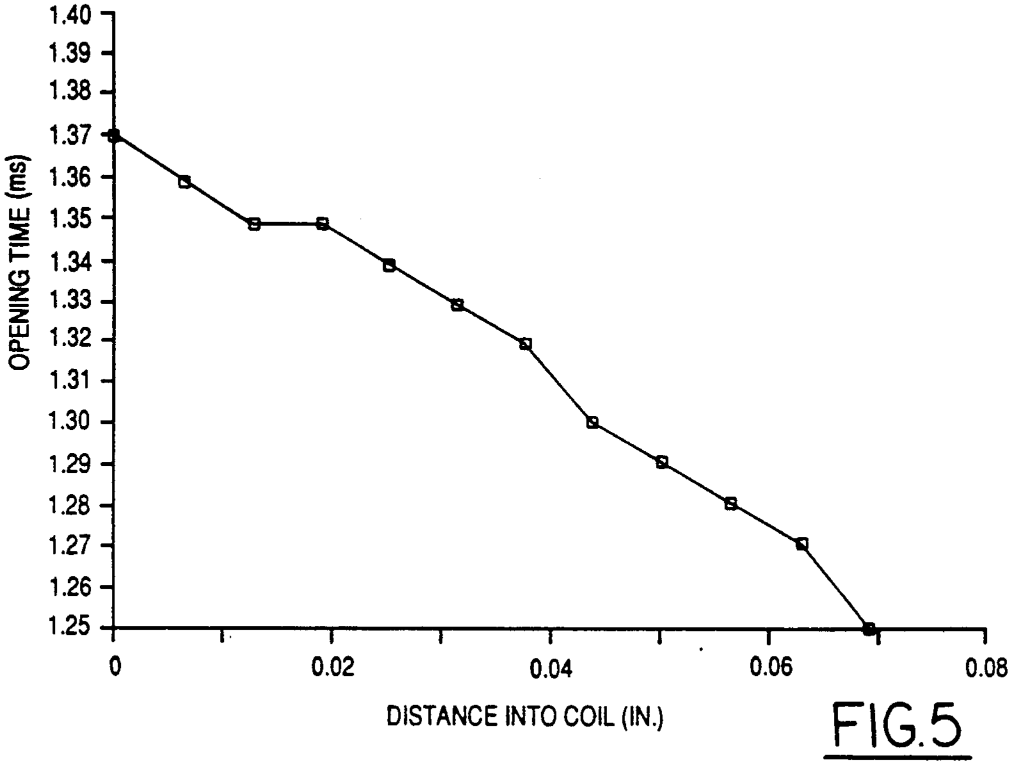
FIGS. 5–8 are several graph plots illustrating the effect of using principles of the invention.
Figure 6:
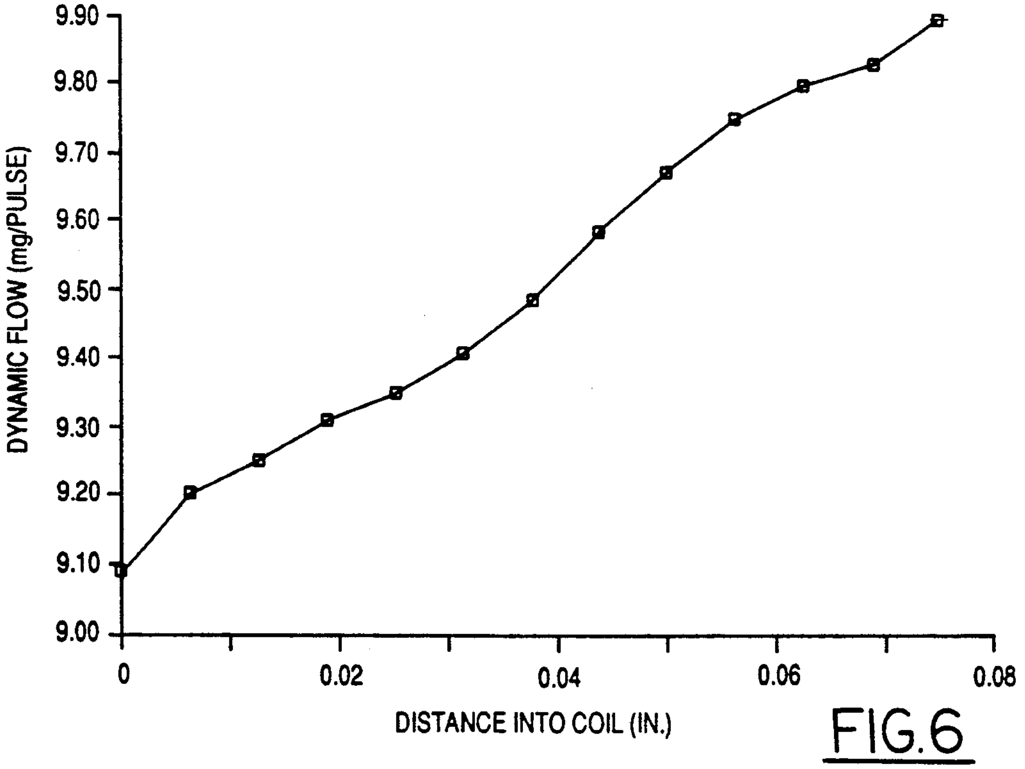
Figure 7:
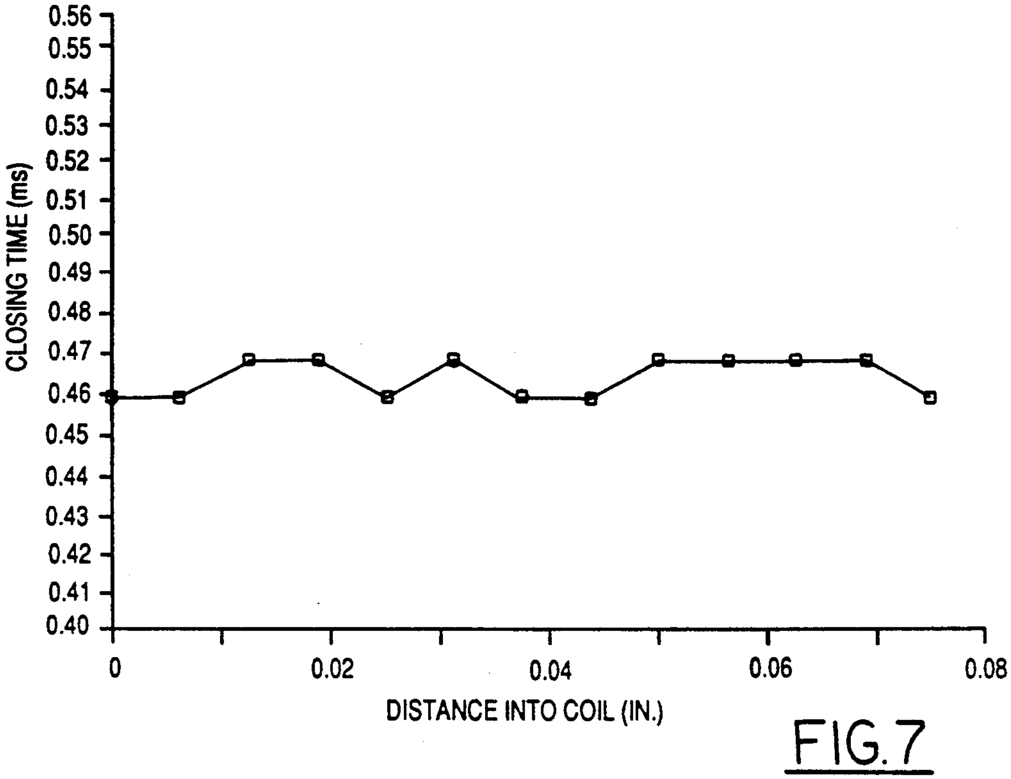
Figure 8:
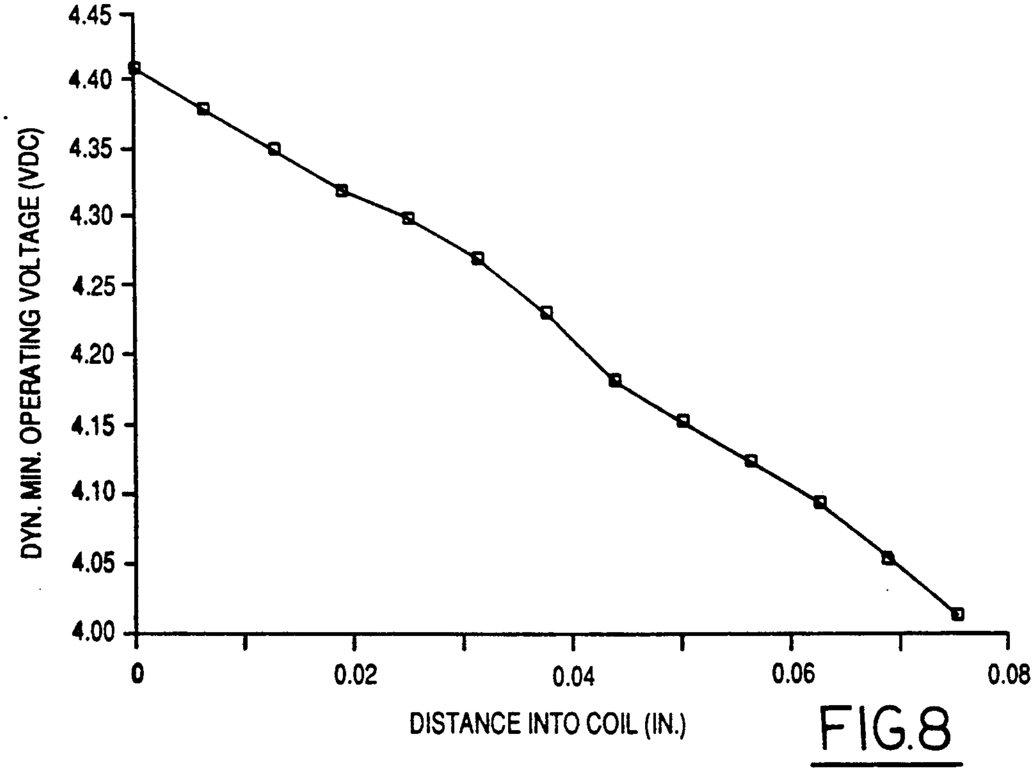

The embodiment of fuel injector 10' in FIGS. 3 and 4 differs from the embodiment 10 of FIGS. 1 and 2 in the construction of the two electrical terminals which correspond to the terminals 34 and 36 of embodiment 10. In embodiment 10' only a single terminal 34' is illustrated and described and it should be understood that the embodiment contains a like-constructed terminal corresponding to terminal 36. Other parts of embodiment 10' corresponding to like parts of embodiment 10 are identified by like reference numerals.

Terminal 34' comprises three parts: a terminal part 34A' that is embedded in bobbin flange 37, a terminal part 34B' that is embedded in head 28B, and a terminal part 34C' that is embedded in surround 86. The latter two terminal parts are electrically connected at a junction point 90. From junction 90, terminal part 34C' extends through the composite material of the surround to form within shell 88 a termination for establishing electrical contact with a corresponding terminal of a mating connector plug (not shown) that connects to the fuel injector when the injector is in use. From junction 90, terminal part 34B' extends through head 28B, suitably insulated therefrom as required, and into engagement with terminal part 34A'.

One of the terminations of the wire that forms coil 33 is electrically joined to terminal part 34A'. Terminal parts 34A' and 34B' are constructed to have a telescopic lost-motion fit that maintains electrically continuity as the set screw 84 is operated to perform the dynamic flow calibration. Because of the lost motion fit, it is possible to perform the dynamic flow calibration after the fabrication of the fuel injector has been completed, i.e. after the surround 86 and shell 88 have been created by the application of composite.

FIGS. 5–8 are self-explanatory graph plots illustrating the effectiveness of dynamic flow calibration in accordance with principles of the invention applied to an actual example.

The organization and arrangement of the illustrated fuel injectors provide for compactness and for assembly processing by automated assembly equipment. The overall fabrication process can be conducted in an efficient manner, and the organization and arrangement are highly conducive to fuel injector miniaturization. While a presently preferred embodiment of the invention has been illustrated and described, it should be appreciated that principles are applicable to other embodiments.

What is claimed is:

1. A method for dynamic flow calibration of a fuel injector which has a body containing an actuating mechanism comprising a selectively energizable solenoid coil assembly that operates a valve element via an armature means to selectively unseat said valve element from a valve seat on said body to selectively open and close the fuel injector to fuel flow, said solenoid coil assembly comprising a selectively energizable solenoid coil for generating magnetic flux and a stator for conducting the magnetic flux to said armature means across a working gap between said stator and said armature means, said method comprising operating the fuel injector under a given set of operating conditions and measuring the fuel injector's dynamic flow under that set of operating conditions, comparing the dynamic flow thus measured with a desired dynamic flow, and if the measured dynamic flow fails to comply with the desired dynamic flow, then securing compliance by selectively positioning said working gap with respect to said solenoid coil.

2. A method as set forth in claim 1 in which the selective positioning of said working gap with respect to said solenoid coil comprises re-positioning said solenoid coil with respect to said armature means.

3. A method as set forth in claim 2 in which the re-positioning of said solenoid coil with respect to said armature means is conducted with said stator being stationary on said body so that said solenoid coil is also re-positioned with respect to said stator.

4. A method as set forth in claim 3 in which said solenoid coil and said stator are disposed coaxially on said body and the re-positioning of said solenoid coil with respect to said armature means and said stator occurs along the coaxis of said solenoid coil and stator.

5. A method as set forth in claim 4 in which the re-positioning of said solenoid coil with respect to said armature means and said stator is conducted by adjusting a threaded element that is operatively disposed to act between said stator and said solenoid coil assembly.

6. A method as set forth in claim 5 in which said threaded element is threadedly engaged with a complementary threaded portion of said stator so as to be adjustably positioned on said stator.

7. A method as set forth in claim 5 in which said fuel injector includes an electrical terminal means which is electrically connected to said solenoid coil and to which a complementary electrical terminal means is connected to operate the fuel injector when the fuel injector is in use, said electrical terminal means of the fuel injector including a lost-motion connection that is effective during adjustment of said threaded element to take up relative motion between said solenoid coil assembly and said stator.

8. A method as set forth in claim 5 in which said fuel injector includes an electrical terminal means to which a complementary electrical terminal means is connected to operate the fuel injector when the fuel injector is in use and a dielectric material disposed on said fuel injector in a desired configuration with respect to said body and electrical terminal means of the fuel injector, and wherein the dynamic flow calibration is performed before a step of molding said dielectric material onto said fuel injector.

9. A method as set forth in claim 1 in which the selective positioning said working gap with respect to said solenoid coil is conducted without changing the size of said working gap.

10. A fuel injector which has a body containing an actuating mechanism comprising a selectively energizable solenoid coil assembly that operates a valve element via an armature means to selectively unseat said valve element from a valve seat on said body to selectively open and close the fuel injector to fuel flow, said solenoid coil assembly comprising a selectively energizable solenoid coil for generating magnetic flux and a stator for conducting the magnetic flux to said armature means across a working gap between said stator and said armature means, characterized by an adjustment mechanism that is effective to selectively position said working gap relative to said solenoid coil so as to obtain a desired dynamic calibration for said fuel injector.

11. A fuel injector as set forth in claim 10 characterized further in that said adjustment mechanism comprises means that is effective to selectively position said working gap relative to said solenoid coil by re-positioning said solenoid coil with respect to said armature means.

12. A fuel injector as set forth in claim 11 characterized further in that said stator is stationarily mounted on said body, and said means that is effective to selectively position said working gap relative to said solenoid coil by re-positioning said solenoid coil with respect to said armature means re-positions said solenoid coil with respect to said stator concurrently with re-positioning of said solenoid coil with respect to said armature means.

13. A fuel injector as set forth in claim 10 in which said adjustment mechanism comprises an adjusting screw that is accessible for adjustment via an axial end of the fuel injector that is opposite an axial end at which fuel is injected from the injector.

14. A fuel injector as set forth in claim 13 in which said adjusting screw is operatively disposed to act between said stator and said solenoid coil assembly.

15. A fuel injector as set forth in claim 14 in which fuel injector includes an electrical terminal means which is electrically connected to said solenoid coil and to which a complementary electrical terminal means is connected to operate the fuel injector when the fuel injector is in use, said electrical terminal means of the fuel injector including a lost-motion connection that is effective during adjustment of said adjusting screw to take up relative motion between said solenoid coil assembly and said stator.

16. A fuel injector as set forth in claim 14 in which said adjusting screw is disposed in a flange of said stator that radially overlaps a bobbin flange of said solenoid coil assembly, said adjusting screw is threadedly engaged with a threaded hole in said stator flange and bears against said bobbin flange.

17. A fuel injector which has a body containing an actuating mechanism comprising a selectively energizable solenoid coil assembly that operates a valve element via an armature means to selectively unseat said valve element from a valve seat on said body to selectively open and close the fuel injector to fuel flow, said solenoid coil assembly comprising a selectively energizable solenoid coil for generating magnetic flux and a stator for conducting the magnetic flux to said armature means across a working gap between said stator and said armature means, an electrical terminal means which is electrically connected to said solenoid coil and to which a complementary electrical terminal means is connected to operate the fuel injector when the fuel injector is in use, characterized by an adjustment mechanism that is effective to selectively position said solenoid assembly on said body, and a lost-motion connection in said electrical terminal means that is effective during adjustment of said adjustment mechanism to take up relative motion between said solenoid coil assembly and said stator.

18. A fuel injector as set forth in claim 17 in which said lost-motion connection comprises telescoping engaged elements.

* * * * *